Feb. 24, 1942. N. A. MILAS Re. 22,038

PREPARATION OF ANTIRACHITIC SUBSTANCES

Original Filed April 8, 1933

Inventor
Nicholas A. Milas
by Pabst, Cushman & Woodbury
his Attorneys.

Reissued Feb. 24, 1942 Re. 22,038

UNITED STATES PATENT OFFICE 22,038

PREPARATION OF ANTIRACHITIC SUBSTANCES

Nicholas A. Milas, Belmont, Mass., assignor, by mesne assignments, to E. I. du Pont de Nemours & Company, Wilmington, Del., a corporation of Delaware Original No. 2,117,100, dated May 10, 1938, Serial No. 665,135, April 8, 1933. Application for reissue May 1, 1940, Serial No. 332,818

12 Claims. (Cl. 204—156)

This invention relates to a new and useful method for producing antirachitic substances from ergosterol, and ergosterol-containing materials.

My method consists essentially in the exposure of ergosterol, under controlled conditions, to a high-frequency oscillating field, the ergosterol being contained in a reaction vessel without electrodes, whereby it is converted into antirachitic substance. The electrodeless reaction vessel may be a tube of glass or of other substantially non-conducting material. The sterol need not be first purified, but may be used admixed with other materials with which it is ordinarily associated in nature or with added materials and/or may be in solution in suitable solvents.

I am acquainted with prior methods of treatment of ergosterol by exposure to ultraviolet light such as is produced from a quartz mercury vapor lamp or other source external to the vessel containing the ergosterol; by high frequency current conducted to the reaction vessel by electrodes; and by bombardment with high speed emanations from a cathode ray tube.

An object of my invention is to provide a method which operates more efficiently and quickly through the release of energy from foci in immediate and intimate contact with the molecules of ergosterol within the reaction vessel, which foci comprise gaseous particles excited by the electro-magnetic field in which the reaction vessel is placed, the reaction vessel being in no contact with electrodes. By means of the electrodeless reaction vessel, my process avoids burning or deleterious localized heating of ergosterol such as would occur at and in the neighborhood of electrodes if they were used. Energy is transmitted from excited gaseous particles more homogeneously and efficiently throughout the reaction vessel than is the case when current is led into such vessel by electrodes, or even when electrodes are led to the outer surface of such vessel, or when ergosterol is subjected to unidirectional bombardment from a cathode ray tube.

The high-frequency oscillating field may be established by impressing an oscillating voltage upon the terminals of a helix made of conductive material, or upon any other suitable device, thereby setting up a field which changes its direction with each alternation of the oscillating current. When a helix is employed for the aforementioned purpose, in the manner specified, there is set up an electro-magnetic field which changes its direction with each reversal of the alternating current. For convenience, hereinafter, both in the specification and in the appended claims, the term "oscillating field" will refer to an oscillating electro-magnetic field and/or oscillating electric field.

The vessel in which the activation of the ergosterol takes place, herein referred to for convenience as "the reaction vessel," is constructed to allow the continued maintenance of any desired pressure within it, and is of any suitable shape. If, for example, the oscillating field is established with the utilization of a helix or coil, the reaction vessel may advantageously be of substantially circular cross-section and of any size to fit conveniently within the helix used in establishing the oscillating field. The size and shape of the helix or other conductor used in establishing the oscillating field and the size and shape of the reaction vessel can be varied to suit the circumstances of use, however, and I do not restrict myself to any particular form or size. It should be noted also that the field exists in various directions about the helix or equivalent apparatus, and extends more or less to other parts of the electrical apparatus associated with it, as for instance in the region of certain variable condensers which may form a part of associated electrical apparatus. Hence I do not restrict myself to any particular location of the reaction vessel and its contents during activation, except of course to say that the reaction vessel must be within a portion of the oscillating field which is sufficiently active to allow of carrying out my process.

As hereinbefore stated, the oscillating field in the process of this invention is established within a reaction vessel either by circumposing a helix or the like about the reaction vessel, or by arranging the reaction vessel within the zone of the oscillating field established by the flow of current through the helix. Hence the terms "electrodeless oscillating field" and "electrodeless discharge" are used synonymously herein and are to be understood as referring to this arrangement, in contradistinction to oscillating fields established by the use of "electrodes" (external or internal) in the sense that an "electrode" is defined as a terminal of an electric circuit by means of which a conduction current is passed into or out of a medium in contact therewith, the medium thus forming part of the electric circuit. I deem this feature of the process highly preferable as providing for the activation of the ergosterol without introducing any complications such as might result from the exposure of the ergosterol to the effects of cathode drop or actual conduction of current. The electrodeless oscillating field employed in my invention is preferably substantially uniform throughout the reaction vessel.

In carrying out my activation process, I may use within the reaction vessel a pressure of the order of approximately 1 millimeter of mercury or even less, preferably from about one-half to one millimeter if necessary. I have successfully used an impressed potential of a few thousand volts and an alternating current of a few hundred milliamperes on the oscillator to carry out my process and secure the desired results. These conditions are not limiting, and it is well known that pressure and voltage values have a mutual relation necessary for the conditions such as those of this invention under which particles, particularly in the gaseous or vapor state, may be excited. Frequencies of from 5000 to 20,000 kilocycles have been successfully used, although the process is not limited to the use of frequencies of these particular values.

It is now recognized by physicists that when a gas at sufficiently low pressure is brought into an oscillating field, as is done in carrying out my process, the first phenomenon is the excitation of one or more particles of the gas by the field. These particles are not excited by any emanations or radiations directed at them from an outside source; on the contrary, their excitation is effected directly by induction from the field. I am not prepared to say definitely what are the succeeding steps after the excitation of these first particles, but I believe that the particles, together with the field, rapidly cause excitation of more and more particles throughout the area of low-pressure gas. In my process, therefore, I believe that energy is transferred within the reaction vessel from the oscillating field to particles of material, which particles, in whole or in part, are brought to the condition known to physicists as "excited." Within the reaction vessel, excited particles, with an energy content greater than they normally possess, release their energy of excitation in whole or in part, upon collision with other particles, such as for instance ergosterol molecules, and this excitation energy is believed to be responsible for the change of sterol to antirachitic substance. Apparently an excited particle which has lost its excitation energy through collision, returns toward its orignal normal state, and may then be re-excited and again transfer energy by collision.

In my process, I believe that the energy utilized for conversion of sterol to antirachitic substance is liberated from excited particles, in part at least of a gaseous or vaporous nature, which particles are in intimate contact and/or admixture with the material to be acted upon. In my process, therefore, the energy electrically induced into the vessel to bring about the desired conversion of sterol to antirachitic substance, is liberated from foci located in intimate relation to the molecules of sterol, thus securing to the process the greatest efficiency of such energy utilization. In the respect just disclosed, my process differs in principle from prior processes wherein sterol or sterol-containing substances are subjected to bombardment from an outside source of radiations or emanations such as ultraviolet light, infra red rays, cathode rays, and X-rays.

While it is not necessary to the successful utilization of my process that the sterol be first purified, nevertheless crystalline ergosterol may be employed as the sole material placed in the reaction vessel, said vessel having been previously freed rigorously from gases and vapors, the sterol being admitted to the vessel by distillation if desired, or admitted in solution or solid form. In general, the reaction vessel should of course be substantially free from substance interfering with the desired reaction. For example, gas such as oxygen which combines chemically with the ergosterol, should be practically excluded to avoid lowering the efficiency of the process, an inert gas such as nitrogen being preferable.

While the full and exact details of such features as excitation of particles, energy changes, physical or chemical reactions, etc., are not completely understood, nevertheless, under the conditions disclosed herein, observation and study indicate the probability that molecules of ergosterol itself, partly in the vapor stage, or particles derived therefrom in the course of the reaction involved, become excited in the oscillating field and either undergo a direct conversion into antirachitic substance, or impart by collision with sterol molecules the energy which is utilized in the change of ergosterol to antirachitic substance. While this explanation appears to account for the successful results which I have obtained by this process, the process can obviously be utilized successfully regardless of the correctness of the said explanation.

Figure 1:
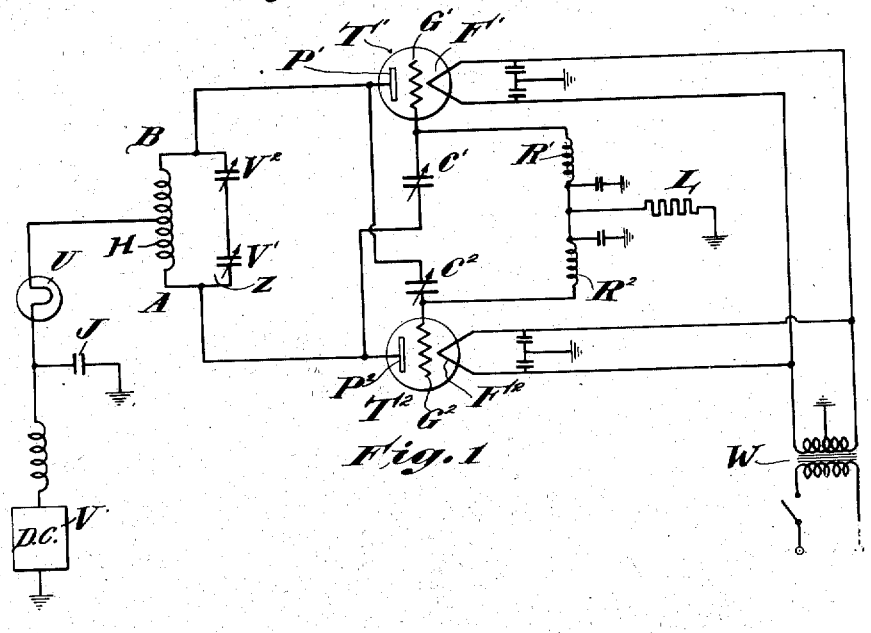
Fig. 1 is the connection diagram of an electric circuit suited to provide high-frequency oscillations.

The oscillatory field for purposes of the present invention may be obtained by any suitable means or apparatus adapted to produce oscillations of the high frequency desired. A practical and especially suitable oscillator circuit of the so-called push-pull type is illustrated in Fig. 1, although the invention is not intended to be limited to the use of this particular circuit or type of circuit. In this figure, $T^1$ and $T^2$, respectively, are conventional three-electrode vacuum tubes of the type preferred for oscillator circuits, with cathodes $F^1$ and $F^2$, grids $G^1$ and $G^2$, and anodes $P^1$ and $P^2$, respectively. An oscillatory circuit Z comprises a helix H constituting the inductance of the circuit, and variable condensers $V^1$ and $V^2$ constitute the capacitance of circuit Z. A tap of helix H, in its approximate center, is connected to the anode voltage supply V which may consist of any convenient source of direct current of appropriate voltage, as for instance a rectifier. A safety fuse, as for example a fuse lamp U, a small grounded condenser J and a radio frequency choke coil, are inserted in the direct current supply circuit for reasons well known in the art. Opposite points X and Y of circuit Z are connected to plates $P^1$ and $P^2$ respectively, whereas grids $G^2$ and $G^1$, respectively, are crosswise joined to plates $P^1$ and $P^2$, respectively, through grid excitation condensers $C^1$ and $C^2$, respectively. The grids are also connected to ground through radio frequency choke coils $R^1$ and $R^2$, respectively, and a grid leak L, of well known function.

In the embodiment shown, the filaments $F^1$ and $F^2$ are supplied with alternating current in the manner common for this purpose, from a transformer W. The filament supply circuits are preferably shielded from the other parts of the arrangement.

In well known manner, a high frequency oscillatory field can be set up within and about helix H upon applying the anode voltage, and the frequency of this field can be adjusted by means of condensers $V^1$ and $V^2$. Or, by electrically connecting two plates to the terminals A and B of helix H, a high-frequency oscillatory field can be set up between such plates.

Figure 2:
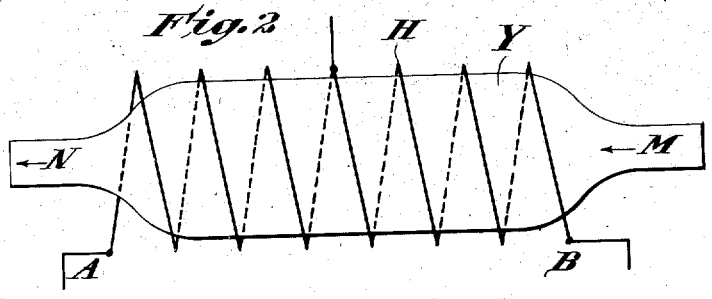
Fig. 2 is a diagrammatic view of a suitable reaction vessel, showing this vessel in association with the inductance element of the oscillating circuit of Fig. 1.

Referring to Fig. 2, the reaction vessel Y, of suitable non-conducting material such as glass, is shown as inserted within the helix H of the oscillator circuit such as previously described, and shown in Fig. 1. The vesesl Y is shown as provided with an exit N, which may be connected to a suitable evacuating device adapted to provide the reduced pressures of the order indicated. In operating the process continuously, the entrance M may be placed in communication with a source of supply of the ergosterol, for example, any suitable device for distilling the ergosterol and/or supplying it in the form of a vapor; in operating in batches, the entrance M is sealed or otherwise tightly closed.

Figure 3:
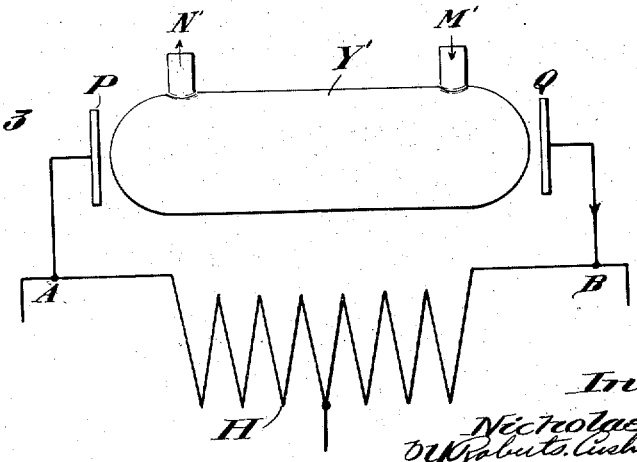
Fig. 3 is a diagrammatic view of an alternate form of reaction vessel, also shown in association with the inductance element of Fig. 1.

In the form of apparatus shown in Fig. 3, which is less efficient than that of Fig. 2, but nevertheless is illustrative of the principle of the invention, the reaction vessel $Y^1$ is disposed adjacent to the helix H and within the zone of the oscillating field established by current flowing through the helix, so that the material under treatment is subjected to the resultant alternating electric and electro-magnetic fields. If desired, plates P and Q may be disposed at opposite ends of the reaction vessel and these plates may be connected to the terminals A and B of the helix H of the same oscillator previously described. The vessel $Y^1$ is shown as provided with an entrance and exit $M^1$ and $N^1$, which may be used in the ways described in connection with the apparatus of Fig. 2.

As examples of the successful operation of the process of this invention, I cite the following:

*Example I.*—In the field of the coil of a high-frequency oscillator, arranged substantially as shown in Fig. 1, with input (exclusive of filament power) of approximately 250 to 350 watts, and with an oscillating frequency of 6000 to 6500 kilocycles per second, there was placed a reaction vessel consisting of a tube of "Pyrex" glass of approximately 18 millimeters diameter, containing a small quantity of solid ergosterol of melting point 163–164° C., in an atmosphere of nitrogen gas. The contents of the tube were reduced to and maintained at a pressure of approximately 0.5 millimeter of mercury, as indicated by a McLeod gauge connected thereto. The tube and its contents were subjected to the oscillating field, with frequent rotation of the tube, about its long axis, for five minutes. The so-treated ergosterol was then removed from the tube with anhydrous ethyl ether and the latter was promptly thereafter removed with vacuum at ordinary room temperature. The residue from evaporation was weighed and taken up into solution with a small amount of ether and the ether solution added to a measured quantity of liquid petrolatum. The ether was removed from the petrolatum by vacuum and the remainder was assayed biologically for its antirachitic curvature property according to accepted standardized methods with albino rats. This assay showed a potency equivalent to more than 50,000 vitamin D rat units per gram of reaction product, i. e., of the treated ergosterol removed from the reaction vessel by ethyl ether.

*Example II.*—With conditions similar to those in Example I, but with a longer period of exposure, namely twenty-five minutes, and a reaction vessel of larger diameter, namely 44 millimeters, a product was obtained which when assayed for antirachitic potency exhibited the equivalent of more than 250,000 vitamin D units per gram.

*Example III.*—With an oscillator operating at a frequency of 17,000 kilocycles, or thereabouts, and employing 1.5 grams of ergosterol, with three five-minute periods of exposure to the oscillating field, other conditions being substantially the same as in Example I, a biological assay showed the equivalent of more than 40,000 vitamin D rat units per gram.

I have sometimes found it advantageous to treat a quantity of ergosterol or ergosterol-containing material in the reaction vessel in the manner described in Example I, thereafter removing the reaction product from the vessel with ethyl ether, removing the ethyl ether by vacuum, extracting the antirachitic substance by methyl alcohol, and then returning the residue to the reaction vessel for further similar treatment. By successive treatments in the reaction vessel and extractions (four of each, for example) I have succeeded in recovering at least 75% of the original quantity of ergosterol in the form of antirachitic substance averaging over 100,000 rat units per gram.

Numerous other experiments to secure activation have been carried out successfully with variations in the factors hereinbefore mentioned, such as for instance, increasing the proportion of ergosterol vapor and excluding rigidly all gases. Too great departure from the optimum ranges as so far determined tends to give poorer results. Thus too short a time of exposure in the oscillating field, or too prolonged a time of exposure, unless there is considerable compensation in other factors, will give products of less potency than those cited.

It will be obvious that while the factors which apparently determine the efficiency of the reaction are numerous, nevertheless with any particular apparatus and particular set of operating conditions, it is possible, by making several runs of various length, to determine the optimum time of exposure yielding a product of maximum potency. An optimum time of exposure of from 5 to 30 minutes may be expected when employing apparatus such as described with a frequency of 5000 to 20,000 kilocycles, and a pressure in the reaction vessel of between one-half and one millimeter of mercury.

The measurements of pressure which are given in this specification and in the appended claims should be of course understood as absolute pressure measurements.

I claim:

1. Process for producing antirachitic substance from ergosterol or ergosterol-containing materials, comprising exposing the same under low pressure to the action of a high-frequency oscillating electrodeless discharge.

2. Process for producing antirachitic substance from materials comprising or consisting of ergosterol which comprises subjecting the latter, under a pressure of about one-half to one millimeter of mercury, to an electrodeless discharge.

3. Process for producing antirachitic substance from matter comprising or consisting of ergosterol, which comprises subjecting the latter, under a pressure of about one-half to one millimeter of mercury, to an electrodeless discharge, operating at a frequency of about 5000 to 20,000 kilocycles per second.

4. Process for producing antirachitic substance, which comprises subjecting matter comprising or consisting of ergosterol under a pressure of about one-half to one millimeter of mercury, to an electrodeless discharge, operating at a frequency of several thousand kilocycles per second.

5. Process for producing antirachitic substance from matter comprising or consisting of ergosterol, which comprises subjecting the latter, under a pressure of about one-half to one millimeter of mercury, to an electrodeless discharge, operating at a frequency of 5000 to 20,000 kilocycles per second, for a period of between 5 and 30 minutes.

6. The process of treating an activatable substance to develop therein the antirachitic (vitamin D) property which consists in vaporizing said substance, and subjecting the vaporized substance to an electrodeless discharge.

7. The process of treating ergosterol to develop therein the antirachtic (vitamin D) property which consists in vaporizing the ergosterol under reduced pressure, and subjecting the same to an electrodeless discharge.

8. The process of treating an activatable substance to develop therein the antirachitic (vitamin D) property which comprises subjecting said substance to an electrodeless discharge.

9. The process of treating an activatable substance to develop therein the antirachitic (vitamin D) property which comprises exposing said substance under low pressures to the action of an electrodeless discharge.

10. The process of treating ergosterol or ergosterol-containing material to develop therein the antirachitic (vitamin D) property which comprises vaporizing the ergosterol under reduced pressure and subjecting the vapor to an electrodeless discharge.

11. The method of producing vitamin D which comprises vaporizing activatable material, and subjecting said material while in the vapor state to a high frequency electrical oscillating discharge under a high vacuum to impart thereto the antirachitic (vitamin D) property.

12. The process of treating an activatable substance to develop therein the antirachitic (vitamin D) property, which comprises heating and vaporizing said substance, and subjecting said vapors to a high frequency electrical oscillating discharge under a high vacuum to impart thereto the antirachitic (vitamin D) property.

NICHOLAS A. MILAS.